United States Patent
Jang et al.

(10) Patent No.: US 10,505,649 B2
(45) Date of Patent: Dec. 10, 2019

(54) METHOD AND APPARATUS FOR PERFORMING MEASUREMENT IN COMMUNICATION SYSTEM IN WHICH WIRELESS WIDE AREA NETWORK AND WIRELESS LOCAL AREA NETWORK ARE AGGREGATED

(71) Applicant: Samsung Electronics Co., Ltd., Gyeonggi-do (KR)

(72) Inventors: Jae-Hyuk Jang, Gyeonggi-do (KR); Sang-Bum Kim, Gyeonggi-do (KR); Soeng Hun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 92 days.

(21) Appl. No.: 15/821,299

(22) Filed: Nov. 22, 2017

(65) Prior Publication Data

US 2018/0145774 A1    May 24, 2018

(30) Foreign Application Priority Data

Nov. 24, 2016    (KR) .................... 10-2016-0157152

(51) Int. Cl.

| | | |
|---|---|---|
| *H04B 17/318* | (2015.01) | |
| *H04W 24/10* | (2009.01) | |
| *H04W 48/20* | (2009.01) | |
| *H04W 36/00* | (2009.01) | |
| *H04W 84/12* | (2009.01) | |
| *H04W 88/06* | (2009.01) | |

(52) U.S. Cl.
CPC .......... *H04B 17/318* (2015.01); *H04W 24/10* (2013.01); *H04W 36/0069* (2018.08); *H04W 48/20* (2013.01); *H04W 36/0085* (2018.08); *H04W 84/12* (2013.01); *H04W 88/06* (2013.01)

(58) Field of Classification Search
CPC .... H04B 17/318; H04W 48/20; H04W 24/10; H04W 84/12
See application file for complete search history.

(56) References Cited

U.S. PATENT DOCUMENTS

| | | | | |
|---|---|---|---|---|
| 2013/0083661 | A1* | 4/2013 | Gupta ..................... | H04W 4/70 370/235 |
| 2013/0242965 | A1* | 9/2013 | Horn ...................... | H04W 24/10 370/338 |
| 2015/0350988 | A1* | 12/2015 | Himayat ............... | H04W 36/22 370/331 |
| 2016/0100449 | A1* | 4/2016 | Jang ...................... | H04W 76/16 370/252 |
| 2017/0127330 | A1* | 5/2017 | Payyappilly .......... | H04W 24/10 |
| 2018/0192346 | A1* | 7/2018 | Nagasaka ............. | H04W 28/08 |

* cited by examiner

*Primary Examiner* — Shailendra Kumar
(74) *Attorney, Agent, or Firm* — The Farrell Law Firm, P.C.

(57) ABSTRACT

A method of performing measurement by a user equipment (UE) is disclosed and includes accessing a wireless local area network (WLAN) access point (AP) while maintaining access to an evolved NodeB (eNB) for wireless wide area communication; measuring a received signal strength indication of the accessed WLAN AP; and when the received signal strength indication is less than or equal to a first threshold, measuring at least one adjacent WLAN AP.

16 Claims, 6 Drawing Sheets

METHOD AND APPARATUS FOR PERFORMING MEASUREMENT IN COMMUNICATION SYSTEM IN WHICH WIRELESS WIDE AREA NETWORK AND WIRELESS LOCAL AREA NETWORK ARE AGGREGATED

PRIORITY

This application claims priority under 35 U.S.C. § 119(a) to Korean Patent Application No. 10-2016-0157152 filed in the Korean Intellectual Property Office on Nov. 24, 2016, the disclosure of which is hereby incorporated by reference.

BACKGROUND

1. Field of the Disclosure

The present disclosure relates generally to a method and an apparatus for performing a measurement in a communication system and, more particularly, to performing a measurement on a wireless local area network in a communication system in which a wireless wide area network and a wireless local area network are aggregated.

2. Description of the Related Art

A wireless wide area network (WWAN) is one type of wireless communication network, which allows user equipment (UE) within coverage to access the network through a base station (BS) having a specific broadband coverage. Radio access technology (RAT) used for the WWAN may include long-term evolution (LTE), worldwide interoperability for microwave access (WiMAX), universal mobile telecommunications system (UMTS), global system for mobile communication (GSM), code division multiple access (CDMA), or cellular digital packet data (CDPD), but is not necessarily limited thereto.

A wireless local area network (WLAN) is a wireless network that provides a connection between devices within a limited area, such as a home, a school, or an office. The UE may access the network by accessing an access point (AP) within the WLAN.

In order to improve throughput and provide seamless network access, technology by which the UE simultaneously accesses the WWAN and the WLAN has been developed, and LTE-WLAN aggregation (LWA) is being standardized by the 3$^{rd}$ Generation Partnership Project (3GPP).

In a network in which the WWAN and the WLAN are aggregated, a method of efficiently measuring the WLAN by the UE is required.

SUMMARY

The present disclosure has been made to address at least the above problems and/or disadvantages and to provide at least the advantages described below. Accordingly, an aspect of the present disclosure is to provide a WLAN measurement method capable of reducing the measurement burden on the UE in a network in which a WWAN and a WLAN are aggregated.

Another aspect of the present disclosure is to provide a WLAN measurement method capable of reducing the amount of power consumed by a UE in a network in which a WWAN and a WLAN are aggregated.

In accordance with an aspect of the present disclosure, a method of performing a measurement by a UE is provided. The method includes accessing a WLAN AP while maintaining access to an evolved NodeB (eNB) for wireless wide area communication; measuring a received signal strength indication of the accessed WLAN AP; and when the received signal strength indication is less than or equal to a first threshold, measuring at least one adjacent WLAN AP.

In accordance with another aspect of the present disclosure, a UE is provided that includes a transceiver; and a processor connected to the transceiver, wherein the processor accesses a WLAN AP while maintaining access to an eNB for wireless wide area communication, measures a received signal strength indication of the accessed WLAN AP, and measures at least one adjacent WLAN AP when the received signal strength indication is less than or equal to a first threshold.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1:
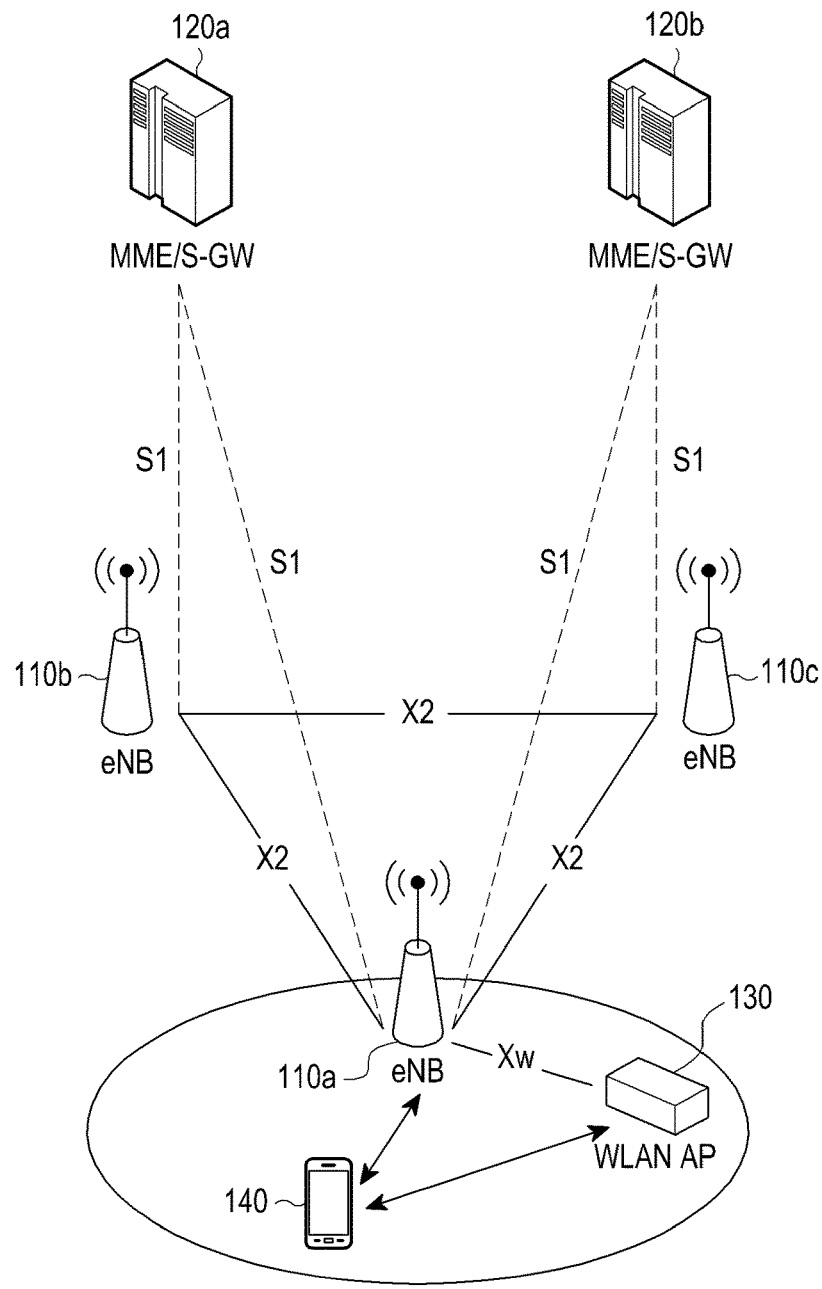
FIG. 1 illustrates the structure of a wireless network, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

It is to be understood that terms such as "first" and "second" are used to describe various elements which are not limited by such terms (i.e., "first" or "second"). The terms are used to distinguish one element from another element. Accordingly, a "first" element mentioned below can be a "second" element without exceeding the technical scope of the present disclosure.

FIG. 1 illustrates the structure of a wireless network, according to an embodiment of the present disclosure. Referring to FIG. 1, a wireless network 100 may include BSs (or eNBs) 110a, 110b, and 110c, mobile management entities (MMEs)/serving-gateways (S-GWs) 120a and 120b, and an AP 130.

The BSs 110a, 110b, and 110c are access nodes of a cellular network that provide the WWAN, and may provide radio access to a UE that accesses one of the BSs 110a, 110b, and 110c. The BSs 110a, 110b, and 110c may provide access to a core network to UEs. The BSs 110a, 110b, and 110c may be replaced with other terms known to those skilled in the art such as a NodeB, an eNB, and a network node. The BSs 110a, 110b, and 110c may communicate with each other through an X2 interface.

The MMEs/S-GWs 120a and 120b may manage mobility of the UE. Further, the MMEs/S-GWs 120a and 120b may manage authentication of the UE that accesses the network. The MMEs/S-GWs 120a and 120b may process packets received from the BSs 110a, 110b, and 110c and packets to be forwarded to the BSs 110a, 110b, and 110c. The MME and the S-GW may be individual entities. The MMEs/S-GWs 120a and 120b may communicate with the BSs 110a, 110b, and 110c through an S1 interface.

The AP 130 is an access node of the WLAN, and may provide radio access to a UE 140. The AP 130 may be controlled by the BS 110a, and may provide access to the WLAN for multiple access to the WWAN and the WLAN to the UE 140. The AP 130 may be connected to the BS 110a through an Xw interface, and may be included in the BS 110a. The BS 110a may transmit some pieces of downlink data directly to the UE 140 and other pieces of the downlink data to the UE 140 through the AP 130. The UE 140 may transmit some pieces of uplink data to the BS 110a and other pieces of uplink data to the AP 130.

The UE 140 may access a cellular network through the BS 110a and may secure higher throughput by additionally accessing the AP 130. Even though the MMEs/S-GWs 120a and 120b does not recognize that the UE 140 simultaneously accesses the BS 110a and the AP 130, multiple-access service may be provided to the UE 140. When the RAT provided by the BS 110a is LTE, such multiple access may be referred to as LTE-WLAN aggregation.

When multiple access is provided to the UE 140, the type of connection through which data is transmitted should be determined. For example, in a downlink, the BS 110a may receive data from the core network and determine whether to transmit the data to the UE 140 directly or through the WLAN. In an uplink, the type of access through which the UE 140 transmits data may also be determined by the BS 110a.

Figure 2:
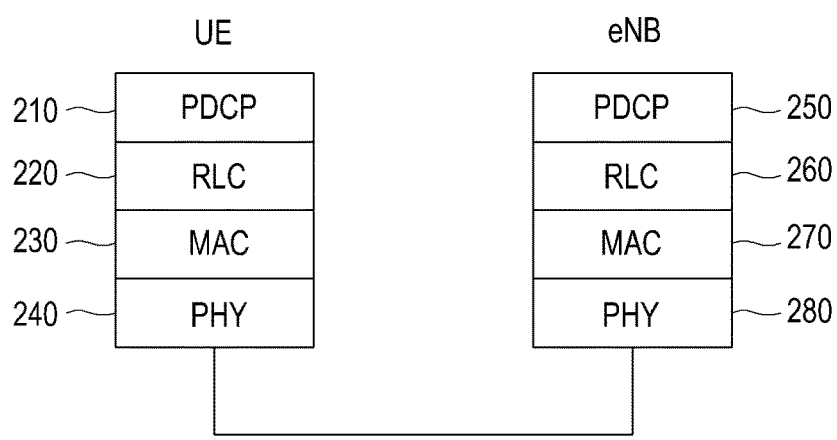
FIG. 2 illustrates a radio protocol structure, according to an embodiment of the present disclosure.

FIG. 2 illustrates a radio protocol structure, according to an embodiment of the present disclosure. Although FIG. 2 illustrates a radio protocol structure of an LTE system, the present disclosure can be applied to WWANs of other RATs. Similarly, LTE terms can be applied to WWANs of other RATs.

Referring to FIG. 2, with respect to the UE and the eNB (BS), the radio protocol may include packet data convergence protocol (PDCP) layers 210 and 250, radio link control (RLC) layers 220 and 260, medium access control (MAC) layers 230 and 270, and physical (PHY) layers 240 and 280.

The PDCP layers 210 and 250 may compress and reconstruct an internet protocol (IP) header. The RLC layers 220 and 260 may reconfigure a PDCP packet data unit (PDU) to be the proper size. The MAC layers 230 and 270 may be connected to a plurality of RLC layer devices included in one UE, multiplex RLC PDUs to an MAC PDU and demultiplex the RLC PDUs from the MAC PDU. The PHY layers 240 and 280 may perform channel coding and modulation on higher layer data, generate an orthogonal frequency division multiplexing (OFDM) symbol, transmit the generated OFDM symbol to a radio channel, perform demodulation and channel decoding on the OFDM symbol received through the radio channel, and transmit the OFDM symbol to a higher layer. Further, the PHY layers 240 and 280 may use a hybrid automatic repeat request for additional error correction, and a receiving side may transmit information on a HARQ ACK/NACK (i.e., a command for HARQ acknowledgment) response to reception of a packet transmitted from a transmitting side. The HARQ ACK/NACK information may be 1 bit. Downlink HARQ ACK/NACK information for uplink transmission may be transmitted through a physical hybrid-ARQ indicator channel (PHICH), and uplink HARQ ACK/NACK information for downlink transmission may be transmitted through a physical uplink control channel (PUCCH) or a physical uplink shared channel (PUSCH).

The HARQ may be divided into an asynchronous HARQ and a synchronous HARQ according to a transmission scheme. When transmission fails in the asynchronous HARQ, the timing at which retransmission thereof is performed is not fixed. When transmission fails in the synchronous HARQ, the timing at which retransmission thereof is performed is fixed. For example, retransmission may be performed 8 ms after the original transmission. With respect to one UE, a plurality of transmissions and receptions may be simultaneously performed, and each transmission and reception may be separated by a HARQ process identifier. Meanwhile, since the timing for retransmission is not predetermined in the asynchronous HARQ, the BS may provide information on the HARQ process for the original transmission to which every retransmission is related and information on whether the current transmission is initial transmission or retransmission through a physical downlink control channel (PDCCH). More specifically, the information on the HARQ process to which the original transmission for retransmission belongs may be transmitted through a HARQ process ID field within the PDCCH, and the information on whether the current transmission is initial transmission or retransmission may be transmitted through a new data indicator (NDI) field within the PDCCH. When the NDI field is not changed based on a comparison with the existing value, it means retransmission. When the NDI field is changed, it means new transmission. Accordingly, the UE may receive resource allocation information within the PDCCH which the BS transmits, acquire information on transmission, receive data through the physical downlink shared channel in the downlink, and transmit data through the PUSCH in the uplink.

A radio resource control (RRC) layer may exist above the PDCP layers 210 and 250, and the RRC layer may transmit and receive a configuration control message related to access and measurement for radio resource control.

The PHY layers 240 and 280 may include one or a plurality of frequencies/carriers. Simultaneous configuration of a plurality of frequencies/carriers may be referred to as carrier aggregation (CA). Through CA technology, the UE and the BS may communicate with each other through one or more secondary carriers other than primary carriers, and throughput may be improved according to the number of carriers that are used. A cell within the BS using the primary carrier may be referred to as a primary cell (PCell), and a cell using a plurality of secondary carriers may be referred to as a secondary cell (SCell). The CA technology may be applied between different RATs (i.e., LTE and WLAN), as described in FIG. 1. To this end, the UE may measure an adjacent WLAN signal and report the measured signal to the BS, and the BS may determine whether to add or release a specific WLAN based on the report.

Figure 3:
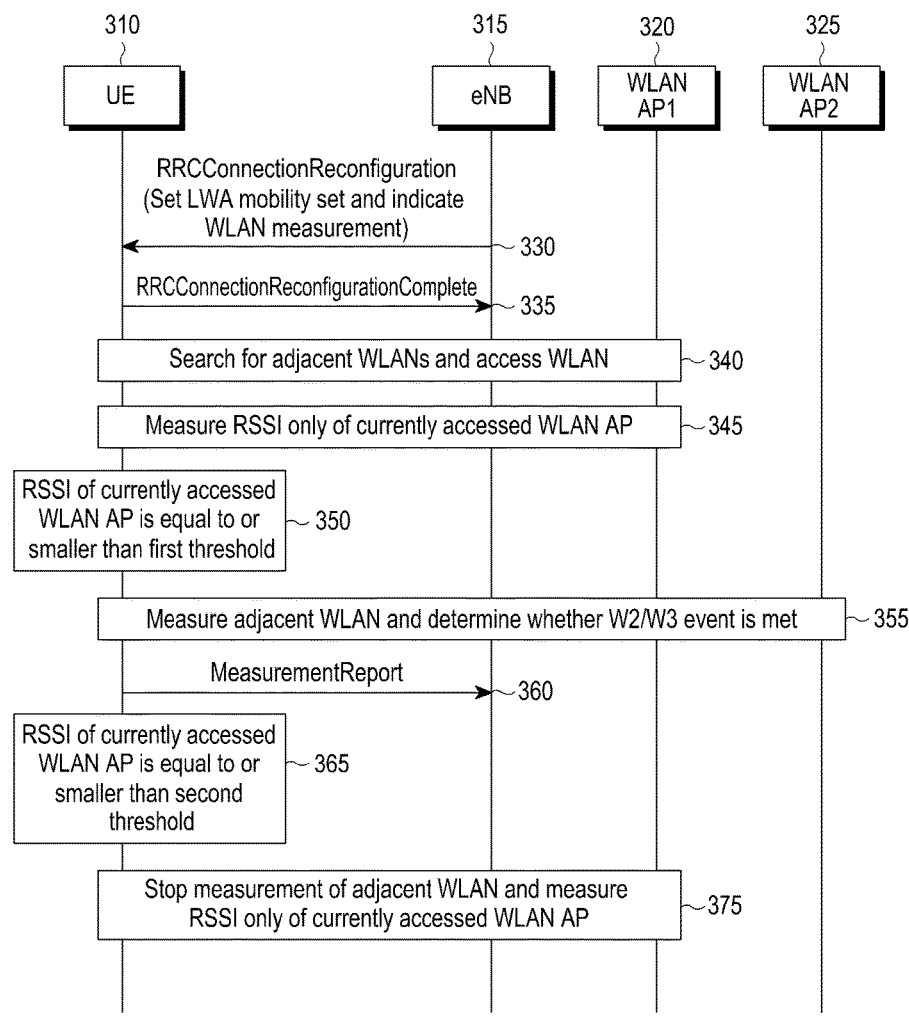
FIG. 3 is a flowchart illustrating the operation of a UE, a BS, and WLAN APs, according to an embodiment of the present disclosure.

A method of performing measurement on the WLAN will be described below with reference to FIG. 3. FIG. 3 is a flowchart of the operation of a UE, an eNB, and WLAN Aps, according to an embodiment of the present disclosure. A UE 310 may be in an RRC connection state (RRC_connected), in which the UE 310 is connected to an eNB 315, and may transmit and receive data.

In step 330, the UE 310 receives an RRC connection reconfiguration (RRCConnectionReconfiguration) message from the eNB 315. The RRC connection reconfiguration message may include an LTE-WLAN aggregation (LWA) mobility set and a WLAN measurement indication. The LWA mobility set may be a set of at least one WLAN AP for performing LWA, and at least one WLAN AP within the LWA mobility set may be measured. The LWA mobility set may be referred to as a WLAN mobility set. The UE 310 may measure at least one WLAN AP within the LWA mobility set, and report the measurement result to the eNB 315 when one of the following event conditions are met:

Event W1: the case in which a measured WLAN exceeds a threshold w1.

Event W2: the case in which signals of all WLAN APs within the WLAN mobility set fall below a threshold w2-1 and signals of WLAN AN outside the WLAN mobility set exceed a threshold w2-2.

Event W3: the case in which signals of all APs within the WLAN mobility set fall below threshold w3.

With respect to the UE 310, the eNB 315 may set a specific event for the measurement report among the events. WLAN APs within the WLAN mobility set may be specified by a specific frequency band or a WLAN identifier (i.e., an SSID). When the WLAN mobility set is configured, the UE 310 may access the WLAN AP within the WLAN mobility set to use the LWA.

In step 335, the UE 310 transmits an ACK response to the RRC connection reconfiguration message to the eNB 315. The ACK response may be transmitted through an RRC connection reconfiguration completion (RRCConnectionReconfigurationComplete) message.

In step 340, in response to reception of the WLAN measurement indication, the UE 310 searches for adjacent WLANs and reports to the eNB on whether there is a WLAN corresponding to the conditions of event W1. When the WLAN AP within the WLAN mobility set is found in an adjacent area, the UE 310 may access the corresponding WLAN AP to use the LWA. In FIG. 3, the UE 310 accesses WLAN AP1 320 for the LWA.

In step 345, the UE 310 measures a received signal strength indication (RSSI) of only the currently accessed WLAN AP (i.e., WLAN AP1 320). More specifically, when event W2 or event W3 is configured, the UE 310 may measure the RSSI of only the currently accessed WLAN AP without measuring adjacent APs to determine whether the conditions of event W2 or event W3 are met.

In step 350, the UE 310 determines whether the RSSI of the currently accessed WLAN AP is less than or equal to or smaller than a first threshold. The first threshold may be a threshold set by the eNB 315, such as w2-1 in event W2, and w3 in event W3. The first threshold may have a value which is greater than the threshold set by the eNB by some offset. In this case, the UE 310 may start a measurement on adjacent WLANs before a specific event is generated, thereby rapidly responding to a change in the surrounding WLAN environment.

When the RSSI of the currently accessed WLAN AP is less than or equal to the first threshold, the UE 310 measures adjacent WLANs and determines whether conditions for the measurement report (i.e., event W2 or event W3) are met in step 355. The measurement in step 355 may be performed on WLAN APs within the WLAN mobility set. When the RSSI of the currently accessed WLAN AP is greater than the first threshold, the UE may continuously measure only the currently accessed WLAN AP without measuring the adjacent WLANs. Since the adjacent WLANs are measured only when the RSSI of the currently accessed WLAN AP is less than or equal to the first threshold, measurement overhead of the UE 310 and the amount of power consumed by the UE 310 are reduced.

In step 360, when the conditions of the measurement report are met, the UE 310 transmits a measurement report (MeasurementReport) to the eNB. In connection with event W2, when conditions related to threshold w2-1 are met and the WLAN AP that meets threshold w2-2 is found, the UE 310 may transmit information thereon to the eNB 315. The eNB 315 may configure a new WLAN mobility set for the UE 310 or release the existing WLAN mobility set based on the received measurement report. When the eNB releases the WLAN mobility set, LWA ends, and all traffic may be directly transmitted from the eNB 315 to the UE 310.

When threshold w2-1 is met and a WLAN AP greater than or equal to threshold w2-2 is found in step 355, the UE may access the WLAN AP through a procedure of access/re-access to the WLAN AP greater than or equal to threshold w2-2.

In step 365, the UE 310 determines whether the RSSI of the currently accessed WLAN AP is greater than or equal to a second threshold. The second threshold may be a value set by the eNB, such as w2-1 or w3. The second threshold may have a value which is greater than the value set by the eNB by some offset. The offset applied to the second threshold may be greater than the offset applied to the first threshold, and the second threshold may be greater than the first threshold.

When the RSSI of the currently accessed WLAN AP is greater than or equal to the second threshold, the UE 310 may stop measuring adjacent WLANs and measure the RSSI only of the currently accessed WLAN AP in step 375.

Figure 4:
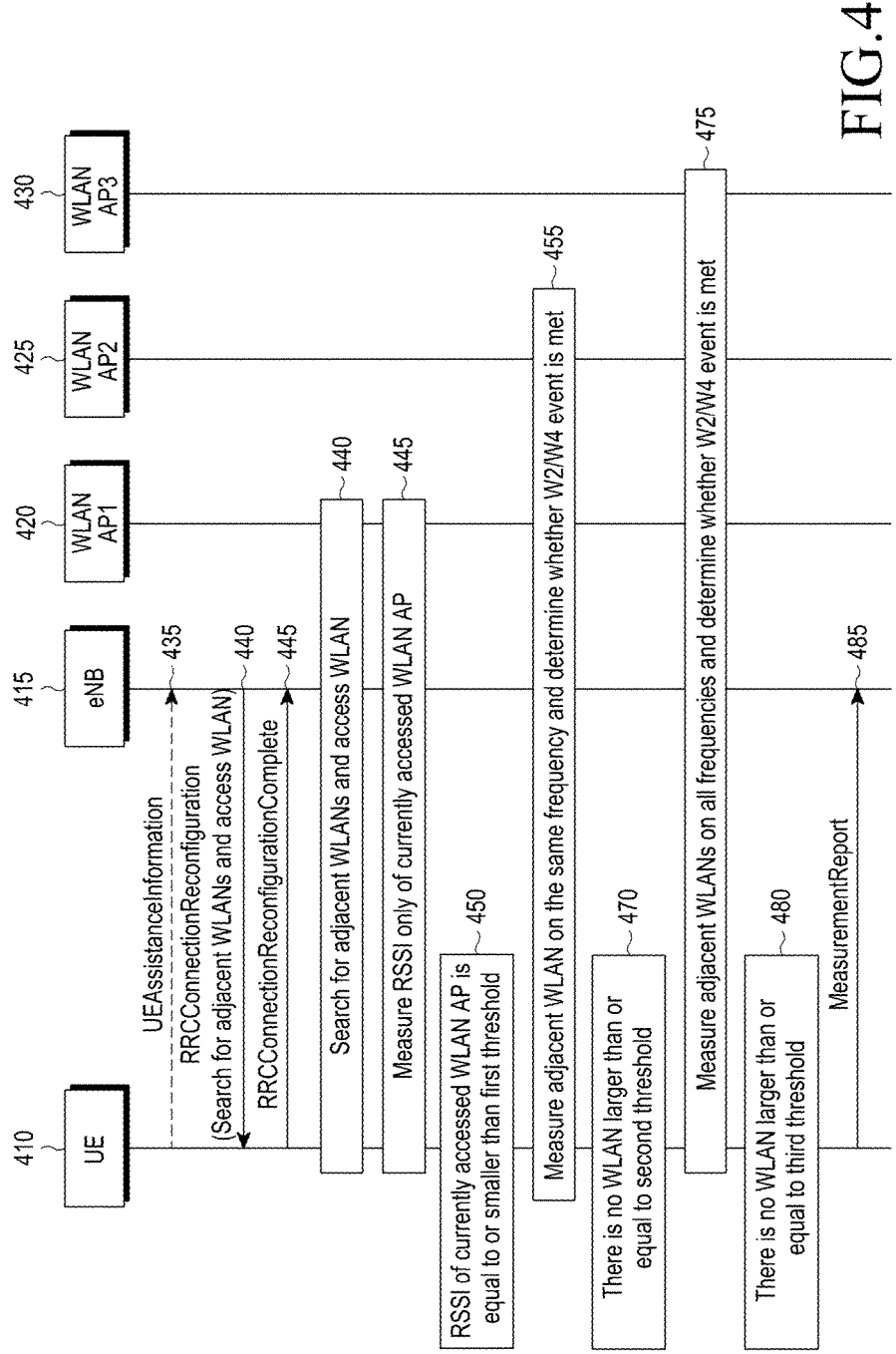
FIG. 4 is a flowchart illustrating the operation of a UE, an eNB, and WLAN APs, according to an embodiment of the present disclosure.

Another embodiment of the present disclosure of measuring the WLAN will be described below with reference to FIG. 4. FIG. 4 is a flowchart of the operation of a UE, an eNB, and WLAN Aps, according to another embodiment of the present disclosure. In step 435, a UE 410 transmits information on a current location of the UE 410 to an eNB 415. The UE 410 may transmit the information on the current location through a UE assistance information (UEAssistanceInformation) message.

In step 410, the UE 410 receives an RRC connection reconfiguration (RRCConnectionReconfiguration) message from the eNB 415. The RRC connection reconfiguration message may include a LWA mobility set and a WLAN measurement indication. The eNB 415 may configure the LWA mobility set with WLAN APs located adjacent to the current location of the UE 410 based on the information on the current location of the UE 410 received in step 435.

In step 445, the UE 410 transmits an ACK response to the RRC connection reconfiguration message to the eNB 415. The ACK response may be transmitted through an RRC connection reconfiguration completion (RRCConnectionReconfigurationComplete) message.

In step 450, in response to reception of the WLAN measurement indication, the UE 410 may search for adjacent WLANs and report on whether there is a WLAN corresponding to the conditions of event W1 to the eNB. When the WLAN AP within the WLAN mobility set is found in an adjacent area, the UE 410 may access the corresponding WLAN AP to use the LWA. In FIG. 4, the UE 410 accesses WLAN AP1 420 for LWA.

In step 455, the UE 410 measures the RSSI only of the currently accessed WLAN AP (i.e., WLAN AP1 420).

In step 450, the UE 410 determines whether the RSSI of the currently accessed WLAN AP is less than or equal to or smaller than a first threshold. The first threshold may be a threshold set by the eNB 415, such as w2-1 in event W2, and w3 in event W3. The first threshold may have a value which is greater than the threshold set by the eNB by some offset.

In step 465, the UE 410 measures adjacent WLANs on the same frequency as that used by the currently accessed WLAN AP and determine whether conditions for the measurement report (i.e., event W2 or event W3) are met. The measurement in step 465 may be performed on WLAN APs within the WLAN mobility set. When the RSSI of the currently accessed WLAN AP is greater than the first threshold, the UE may continuously measure only the currently accessed WLAN AP without measuring the adjacent WLANs.

In step 470, the UE 410 determines whether there is a WLAN greater than or equal to a second threshold according to the measurement result in step 465. The second threshold may be a threshold set by the eNB 415, such as threshold w2-1 in event W2 and w3 in event W3. The second threshold may have a value which is greater than the threshold set by the eNB by some offset.

When there is no WLAN greater than or equal to the second threshold, the UE 410 may measure WLANs on all frequencies as well as on the same frequency as that used by the currently accessed WLAN AP and determine whether conditions for the measurement report (i.e., event W2 or event W3) are met in step 475. The measurement in step 475 may be performed on WLAN APs within the WLAN mobility set.

In step 480, the UE 410 identifies whether there is a WLAN greater than or equal to a third threshold based on the measurement result in step 475. The third threshold may be threshold w2-1 or threshold w3.

When there is no WLAN greater than or equal to the third threshold, the UE 410 may transmit a measurement report (MeasurementReport) to the eNB 415 in step 485. For example, when event W2 is configured, there is no WLAN AP that meets threshold w2-1, and a WLAN AP that meets threshold w2-2 is found, the UE 410 may transmit a measurement report thereon to the eNB 415. The eNB 415 may configure a new WLAN mobility set for the UE 410 or release the existing WLAN mobility set based on the received measurement report. When the eNB releases the WLAN mobility set, LWA ends, and all traffic may be directly transmitted from the eNB 415 to the UE 410.

As described in steps 365 and 375 of FIG. 3, when it is determined that the RSSI of the currently accessed WLAN AP is greater than or equal to a specific threshold (i.e., one of threshold w2-1 and threshold w3 or a value generated by applying an offset to one of threshold w2-1 and threshold w3) while the measurement in step 455 or 475 is performed, the UE 410 may stop measuring the adjacent WLANs and may measure the RSSI of only the currently accessed WLAN AP.

In FIG. 4, the search and measurement ranges of the UE 410 gradually expand from the same frequency range to all frequency ranges, whereby the measurement overhead and the amount of power consumed by the UE 410 may be reduced.

Figure 5:
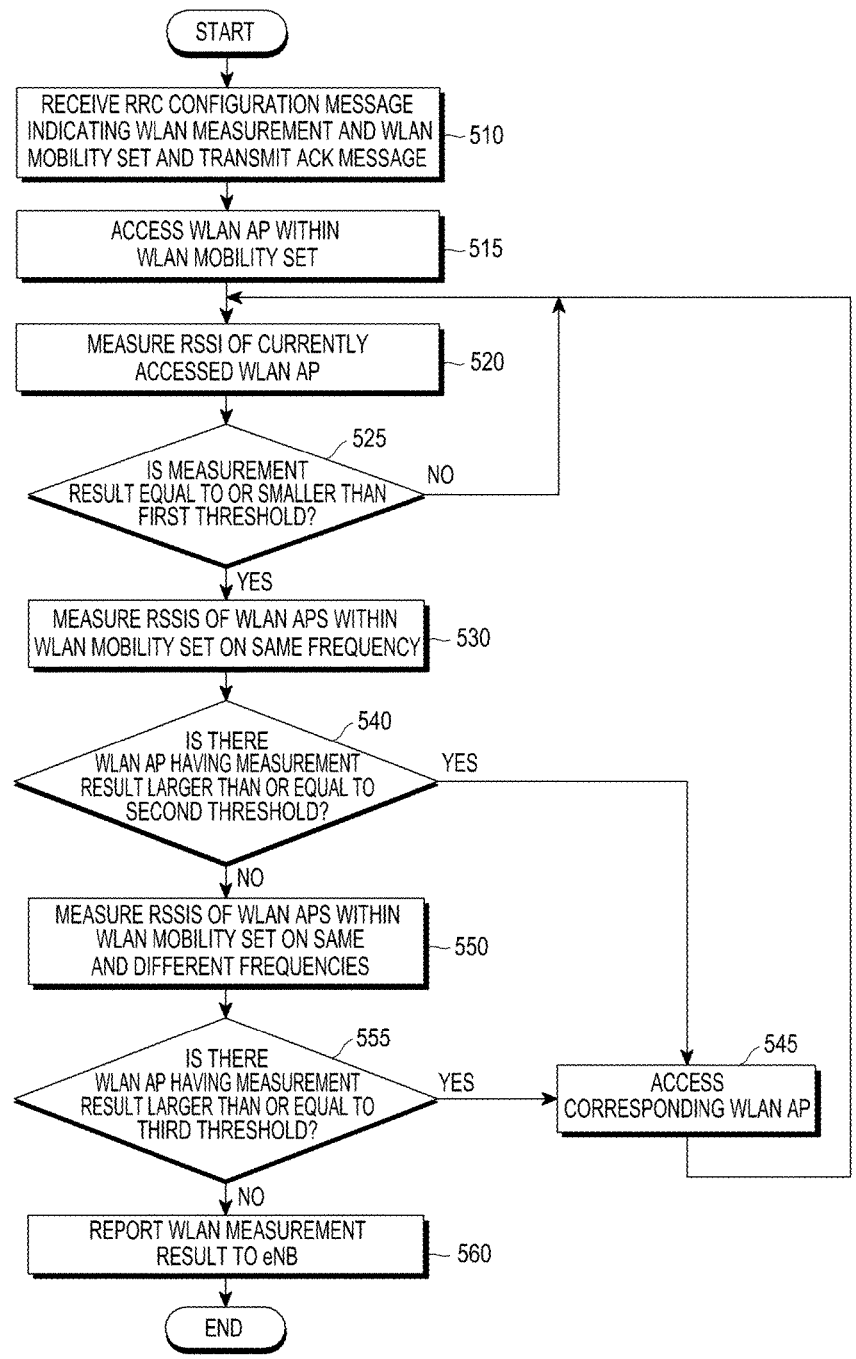
FIG. 5 is a flowchart illustrating the operation of a UE, according to an embodiment of the present disclosure.

The operation of the UE will be described with reference to FIG. 5. FIG. 5 is a flowchart of the operation of the UE, according to an embodiment of the present disclosure. In FIG. 5, the UE is in an RRC connection state with the NB. The UE may periodically transmit information on the current location of the UE to the eNB. The eNB may configure a WLAN mobility set based on the information on the current location of the UE.

In step 510, the UE receives an RRC configuration message (i.e., an RRC connection reconfiguration message) indicating WLAN measurement and the WLAN mobility set. The UE transmits an ACK message (i.e., an RRC connection reconfiguration completion message) in response to the RRC configuration message.

In step 515, the UE accesses the WLAN AP within the received WLAN mobility set.

In step 520, the UE measures the RSSI of the currently accessed WLAN AP.

In step 525, the UE determines whether the RSSI of the currently accessed WLAN AP is less than or equal to or smaller than a first threshold. The first threshold may be the same as the threshold set by the eNB in connection with triggering of the measurement report event, or may be greater than the threshold set by the eNB by some offset. When the RSSI of the currently accessed WLAN AP is greater than the first threshold, the UE performs step 520. When the RSSI of the currently accessed WLAN AP is less than or equal to the first threshold, the UE performs step 530.

In step 530, the UE measures RSSIs of APs within the WLAN mobility set on the same frequency as that used by the currently accessed WLAN In step 540, the UE determines whether there is a WLAN AP having an RSSI greater than or equal to a second threshold based on the measurement result in step 530. The second threshold may be the same as the threshold set by the eNB in connection with triggering of the measurement report event, or may be greater than the threshold set by the eNB by some offset. When there is a WLAN AP having an RSSI greater than or equal to the second threshold, the UE may perform step 545. When there is no WLAN AP having an RSSI greater than or equal to the second threshold, the UE may perform step 550.

In step 545, the HE accesses the WLAN AP having the RSSI greater than or equal to the second threshold. After step 545, step 520 is performed.

In step 550, the UE measures RSSIs of all WLAN APs within the WLAN mobility set on frequencies that are the same as or different from the frequency of the currently accessed AP.

In step 555, the UE determines whether there is a WLAN AP having an RSSI greater than or equal to a third threshold based on the measurement result in step 550. The third threshold may be threshold w2-1 or threshold w3. When there is a WLAN AP having an RSSI greater than or equal to the third threshold, the UE performs step 545. When there is no WLAN AP having an RSSI greater than or equal to the third threshold, the UE performs step 560.

In step 560, the UE reports a measurement result on the WLAN to the eNB.

Figure 6:
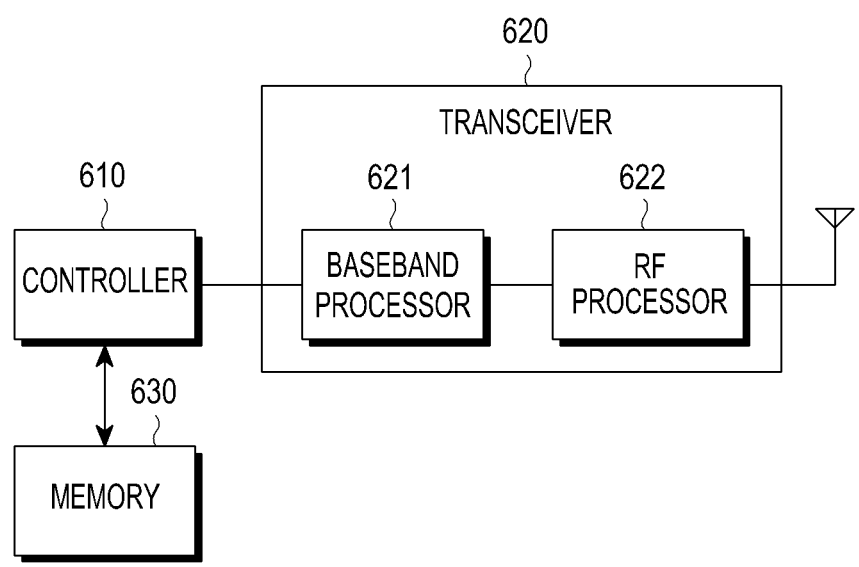
FIG. 6 is a block diagram of a UE, according to an embodiment of the present disclosure.

The UE is described with reference to FIG. 6. FIG. 6 is a block diagram illustrating the UE, according to an embodiment of the present disclosure. Referring to FIG. 6, a UE includes a controller 610, a transceiver 620, and a memory 630.

The controller 610 may be configured by one or more processors, and connected to the transceiver 620 and the memory 630 to operate them. Accordingly, even operations directly performed by the transceiver 620 or the memory 630 may actually be performed according to instructions from the controller 610, and the operations may be performed by the controller 610. The controller 610 may be configured to allow the UE to perform the operations of the UE described above. The controller 610 may include a multiple-access processor for supporting multiple access to the WWAN and WLAN.

The UE may transmit and receive data through the transceiver 620. The transceiver 620 includes a baseband processor 621 and an RF processor 622. The baseband processor 621 may perform conversion between a baseband signal and a bitstream according to a PHY layer standard of the system. In data transmission, the baseband processor 621 may encode and modulate the transmission bitstream to generate complex symbols. Further, in data reception, the baseband processor 621 may demodulate and decode the baseband signal provided from the RF processor 622 to reconstruct the reception bitstream. In data transmission of an OFDM scheme, the baseband processor 621 may encode and modulate the transmission bitstream to generate complex symbols, map the generated complex symbols to subcarriers, perform an inverse fast fourier transform (IFFT) operation, and then insert a cyclic prefix (CP) so as to configure OFDM symbols. Further, the baseband processor 621 may divide the baseband signal provided from the RF processor 622 in the unit of OFDM symbols and perform a fast fourier transform (FFT) operation so as to reconstruct the signals mapped to the subcarriers, and then reconstruct the reception bitstream through demodulation and decoding.

The RF processor 622 may perform a function for transmitting and receiving a signal, such as converting and amplifying a band of the signal, through a radio channel. The RF processor 622 may up-convert the baseband signal provided from the baseband processor 621 into an RF band signal, transmit the up-converted signal through an antenna, and down-convert the RF band signal received through the antenna into the baseband signal. The RF processor 622 may include a transmission filter, a reception filter, an amplifier, a mixer, an oscillator, a digital-to-analog converter (DAC), and an analog-to-digital converter (ADC). The RF processor 622 may include a plurality of RF chains, and may perform beamforming by controlling the phase and size of each of the signals transmitted or received through a plurality of antennas or antenna elements.

At least one of the baseband processor 621 and the RF processor 622 may include different communication modules for processing signals in different frequency bands, such as a super high frequency (SHF) (i.e., 2.5 GHz and 5 GHz) band and a millimeter (mm) wave (i.e., 60 GHz) band.

The memory 630 may store data as temporary or non-temporary data related to calculations performed in the controller 610. The data stored in the memory 630 may include instructions for driving the controller 610.

While the disclosure has been shown and described with reference to certain embodiments thereof, it will be understood by those skilled in the art that various changes in form and detail may be made therein without departing from the spirit and scope of the disclosure as defined by the appended claims and their equivalents.

What is claimed is:

1. A method of performing a measurement by a user equipment (UE), the method comprising:
   accessing a wireless local area network (WLAN) access point (AP) while maintaining access to an evolved NodeB (eNB) for wireless wide area communication;
   measuring a received signal strength of the accessed WLAN AP; and
   if the received signal strength is less than or equal to a first threshold, measuring received signal strengths of one or more adjacent WLAN APs on a frequency identical to that of the accessed WLAN AP;
   if a received signal strength of an adjacent WLAN AP from the one or more adjacent WLAN APs is greater than or equal to a second threshold, accessing the adjacent WLAN AP; and
   if each of the received signal strengths of the one or more adjacent WLAN APs is less than the second threshold, measuring the signal strengths of the one or more adjacent WLAN APs on all frequencies.

2. The method of claim 1, further comprising, if the measurement of the received signal strengths of the one or more adjacent WLAN APs meets a condition of an event that triggers a measurement report, transmitting the measurement report to the eNB.

3. The method of claim 1, further comprising, if the received signal strength is greater than or equal to a third threshold, stopping the measurement of the received signal strengths of the one or more adjacent WLAN APs.

4. The method of claim 3, wherein the third threshold is greater than or equal to the first threshold.

5. The method of claim 3, wherein stopping the measurement of the received signal strengths of the one or more adjacent WLAN APs comprises measuring the received signal strength of the accessed WLAN AP and stopping the measurement of the received signal strengths of the one or more adjacent WLAN APs.

6. The method of claim 1, wherein the second threshold is less than or equal to the first threshold.

7. The method of claim 1, further comprising receiving a measurement indication of WLAN APs and a set of WLAN APs from the eNB,
   wherein accessing the WLAN AP comprises accessing the WLAN AP within the set of WLAN APs, and
   wherein measuring the received signal strengths of the at least one or more adjacent WLAN APs comprises measuring at least one received signal strength of at least one WLAN AP within the set of WLAN APs.

8. The method of claim 7, further comprising transmitting information on a location of the UE to the eNB, wherein the set of WLAN APs is determined by the eNB based on the information on the location of the UE.

9. A user equipment (UE) comprising:
   a transceiver; and
   a processor connected to the transceiver,
   wherein the processor is configured to:
      access a wireless local area network (WLAN) access point (AP) while maintaining access to an evolved NodeB (eNB) for wireless wide area communication,
      measure a received signal strength of the accessed WLAN AP,
      measure received signal strengths of one or more adjacent WLAN APs on a frequency identical to that of the accessed WLAN AP, if the received signal strength of the accessed WLAN AP is less than or equal to a first threshold,
      if a received signal strength of an adjacent WLAN AP from the one or more adjacent WLAN APs is greater than or equal to a second threshold, access the adjacent WLAN AP; and
      if each of the received signal strengths of the one or more adjacent WLAN APs is less than the second threshold, measuring the signal strengths of the one or more adjacent WLAN APs on all frequencies.

10. The UE of claim 9, wherein, if the measurement of the received signal strengths of the one or more adjacent WLAN APs meet a condition of an event that triggers a measurement report, the processor is configured to transmit the measurement report to the eNB.

11. The UE of claim 9, wherein, if the received signal strength is greater than or equal to a third threshold, the processor is configured to stop the measurement of the received signal strengths of the one or more adjacent WLAN APs.

12. The UE of claim 11, wherein the third threshold is greater than or equal to the first threshold.

13. The UE of claim 11, wherein the processor is further configured to measure the received signal strength of the accessed WLAN AP and stop the measurement of the received signal strengths of the one or more adjacent WLAN APs.

14. The UE of claim 9, wherein the third threshold is less than or equal to the first threshold.

15. The UE of claim 9, wherein the processor is further configured to receive a measurement indication of WLAN APs and a set of WLAN APs including the accessed WLAN AP, from the eNB, and
   wherein the processor is further configured to measure the received signal strengths of the one or more adjacent WLAN APs by measuring at least one received signal strength of at least one WLAN AP within the set of WLAN APs.

16. The UE of claim 15, wherein the processor is further configured to transmit information on a location of the UE to the eNB, and the set of WLAN APs is determined by the eNB based on the information on the location of the UE.

* * * * *